United States Patent [19]

Godwin

[11] Patent Number: 5,153,966
[45] Date of Patent: Oct. 13, 1992

[54] LIFTING HANDLE ATTACHMENT FOR WHEELBARROWS

[76] Inventor: Marvin C. Godwin, Rte. 1, Box 965, CC, Howard St., Niceville, Fla. 32578

[21] Appl. No.: 728,386

[22] Filed: Jul. 11, 1991

[51] Int. Cl.⁵ .......................... B62B 1/00; B65D 25/28
[52] U.S. Cl. .................. 16/111 R; 280/47.31; 298/3
[58] Field of Search .............. 16/111 R, 114 R, 125, 16/126, DIG. 12, DIG. 19; 298/2, 3; 280/47.17, 47.24, 47.26, 47.3, 47.31, 47.32, 655, 659, 47.315, 47.371; 30/517, 518, 520, 341; 273/73 J, 75, 81 R, 81 B, 81 C, 68, 81.3, 81.2, 81.4, 165; D21/222; D34/16; 172/13, 15, 17; 56/DIG. 18

[56] References Cited

U.S. PATENT DOCUMENTS

| | | | |
|---|---|---|---|
| 1,463,191 | 7/1923 | Batten | 280/47.31 |
| 2,242,068 | 5/1941 | Harris | 280/47.31 |
| 2,249,603 | 7/1941 | Elkington | 16/114 R |
| 2,951,259 | 9/1960 | Brockner | 30/341 |
| 3,109,653 | 11/1963 | Biggs | 273/165 |
| 3,153,507 | 10/1964 | House | |
| 3,173,705 | 11/1965 | DuPuy | 280/47.31 |
| 3,404,427 | 10/1968 | Mack | |
| 3,604,753 | 9/1971 | Conture | |
| 3,888,501 | 6/1975 | McChesney | 280/47.31 |
| 4,655,492 | 4/1987 | Landry | |
| 4,845,808 | 7/1989 | Millar et al. | 16/114 R |
| 4,951,956 | 8/1990 | Vittone | 280/47.31 |

FOREIGN PATENT DOCUMENTS

| | | | |
|---|---|---|---|
| 709543 | 5/1965 | Canada | 16/125 |
| 1046104 | 12/1953 | France | 280/47.31 |
| 196834 | 9/1986 | Japan | 16/125 |
| 1332010 | 10/1973 | United Kingdom | 280/47.31 |
| 2148208A | 5/1985 | United Kingdom | 280/47.31 |

Primary Examiner—John Sipos
Assistant Examiner—Donald M. Gurley
Attorney, Agent, or Firm—Shlesinger Arkwright & Garvey

[57] ABSTRACT

A multiple-grip lifting handle for a handle shaft of a wheelbarrow comprising a substantially straight base portion, a substantially C-shaped rear portion connected to and extending upwardly in a vertical plane from the base portion and a primary grip portion extending forwardly from the C-shaped portion and above the base portion so as to form a continuous keyhole shaped loop lying in a generally vertical plane. The base portion is disposed at about a 15° acute angle from the primary grip portion with the apex of the angle being generated rearward of the C-shaped portion.

13 Claims, 1 Drawing Sheet

LIFTING HANDLE ATTACHMENT FOR WHEELBARROWS

FIELD OF THE INVENTION

The present invention relates to handles for wheelbarrows and more particularly to a hand grip assembly for a wheelbarrow which is provided with multiple-gripping positions enabling more efficient lifting, moving and dumping of the wheelbarrow.

BACKGROUND OF THE INVENTION

Conventional wheelbarrows include a trough or hopper supported on a pair of parallel handle shafts. The handle shafts extend rearwardly of a front wheel thereby permitting a user to stand between and grasp the ends of the shafts for lifting and maneuvering the wheelbarrow.

The handles of prior art wheelbarrows are generally formed as integral extensions of the shaft ends. These extentions are shaped so as to provide a comfortable grip for the operator when moving the wheelbarrow in a forward position. However, when it becomes necessary to lift and dump the contents within the wheelbarrow or to manipulate the wheelbarrow in a backward direction, problems soon arise.

When lifting a wheelbarrow equipped with conventional handles the wrists of a operator tend to bend backwards, but only a limited amount. Thus, at some point the operator must change his grip from an upward raising movement above the handle to a pushing-type movement from below the handle. With heavy loads, the dexterity and agility required to quickly change the grip position of both hands can be insurmountable. Consequently, the operator will very often dump the contents prematurely by tilting the wheelbarrow on its side. Even if successful in changing grips and pushing the handles upwards from below, he may then be required to entirely overturn the wheelbarrow in order to dump the load and avoid the risk of having to rechange grips. In any event, the movements are awkward and control of the dumping is either erratic or nonexistent. An operators wrist will also bend while urging the wheelbarrow backwards. With a heavy weight in the wheelbarrow, a user will soon tire thereby inviting injury or accident.

In addition, the disposition of conventional handles is such that the operator is often required to bend "at the knees" or bend over when moving forward so as to keep the contents within the wheelbarrow level and avoid spills. This is due in part to the fact that an operator will raise a standard wheelbarrow from the "at rest" level position, to an incline position when the wheelbarrow is lifted and moving forward. Thus, the strain from constantly attempting to keep the contents within the wheelbarrow from spilling makes its use both arduous and uncomfortable.

OBJECTS AND SUMMARY OF THE INVENTION

It is therefore an object of the present invention to provide a multiple-grip wheelbarrow handle which provides separate grasping surfaces for forward movement, rearward movement and dumping of the wheelbarrow.

An additional object of the present invention is to provide a multiple-grip wheelbarrow handle which allows a user to move the wheelbarrow forward without excessively tilting it and spilling the contents therein.

Yet another object of the present invention is to provide a multiple-grip wheelbarrow handle which reduces back and knee strain of the operator during use.

Still a further object of the present invention is to provide a multiple-grip wheelbarrow handle which allows the user to maintain contact with the handle the entire time he is changing from one grasping position to another, thereby reducing the possibility of accident.

Still a further object of the present invention is to provide a wheelbarrow handle which will readily attach to a standard wheelbarrow handle shaft.

Yet a further object of the present invention is to provide a wheelbarrow handle which is arcuate in shape, having no edges or protrusions and thus reduces the chance of injury to the user.

Another object of the present invention is to provide a multiple-grip wheelbarrow handle which promotes user comfort when lifting and maneuvering the wheelbarrow.

Still another object of the present invention is to provide a multiple-grip wheelbarrow handle which increases the ease of lifting and dumping of the wheelbarrow.

Another object of the present invention is to provide a multiple-grip wheelbarrow handle which has a simple unitary construction and is extremely effective in operation.

A further object of the present invention is to provide a wheelbarrow handle which is easily manufactured.

These and other objects of the present invention are accomplished by providing a multiple-grip lifting handle for a handle shaft of a wheelbarrow comprising a substantially straight base portion, a substantially C-shaped rear portion connected to and extending upwardly in a vertical plane from the base portion and a primary grip portion extending forwardly from the C-shaped portion and above the base portion so as to form a continuous key-hole shaped loop, lying in a generally vertical plane when attached to a wheelbarrow handle shaft. The base portion is disposed at about a 15° acute angle from the primary grip portion with the apex of the angle being generated rearward of the C-shaped portion.

DETAILED DESCRIPTION OF THE INVENTION

Figure 1:
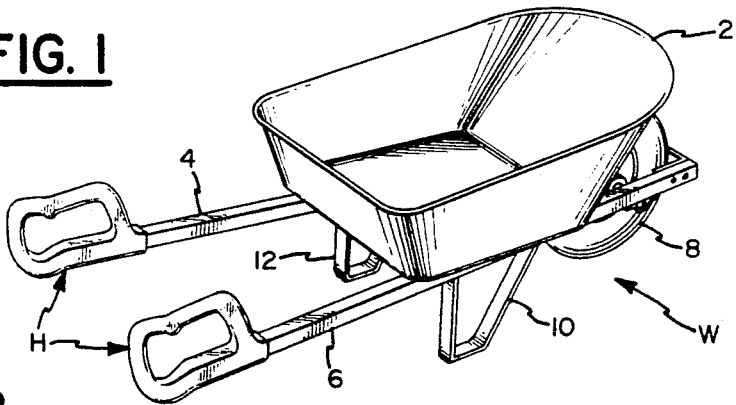
FIG. 1 is a perspective view illustrating the multiple-grip lifting handle of the present invention attached to a conventional wheelbarrow.

FIG. 1 illustrates a wheelbarrow W incorporating the multiple-grip lifting handles H of the present invention. The wheelbarrow W includes a hopper 2 supported on a pair of parallel handle shafts 4 and 6 extending rearwardly of a front wheel 8. The ends of the parallel handle shafts 4 and are provided with the multiple-grip lifting handle H. The wheelbarrow W is also provided with parallel supports 10 and 12 positioned underneath the hopper 2 for supporting the wheelbarrow W while resting.

Figure 2:
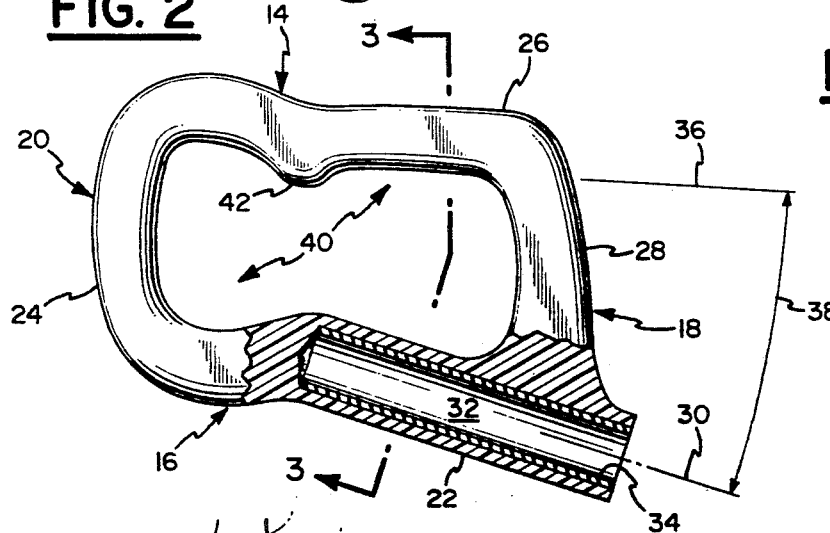
FIG. 2 is a top plan view of the multiple-grip lifting handle with portions broken away to show the handle shaft receiving area and sleeve.
Figure 3:
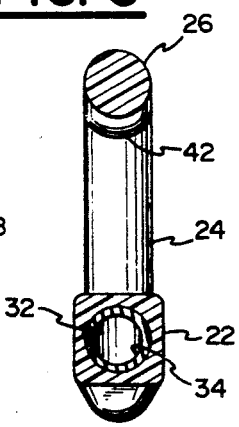
FIG. 3 is a cross-sectional end view taken along lines 3—3 of FIG. 2.

Turning now to FIGS. 2 and 3, a multiple-grip lifting handle H is shown as generally comprising an upper portion 14, lower portion 16, forward portion 18 and rear portion 20. The multiple-grip lifting handle H is further defined by a substantially straight base portion 22, a C-shaped portion 24, a primary grip portion 26 and a vertical connector portion 28.

As best shown in FIG. 1, the substantially straight base portion 22 of the handle H co-axially extends from the longitudinal axis of the wheelbarrow handle shafts 4 and 6. Returning now to FIG. 2, the longitudinal axis of the base portion 22 is indicated by line 30. A handle shaft receiving area 32 is disposed within the base portion 22. The handle shaft receiving area 32 has a size and dimension which readily allows the handle H to be affixed to the ends (not shown) of the parallel handle shafts 4 and 6. The handle shaft reoeiving area 32 is also provided with a sleeve member 34 providing a tight interfit when the handle H is attached to the ends of the parallel handle shafts 4 and 6.

The C-shaped rear portion 24 is connected to and extends upwardly in a vertical plane from the base portion 22 and towards the wheelbarrow handle shafts 4 and 6. A substantially horizontal primary grip portion 26 extends forwardly from the C-shaped rear portion 24 and above the base portion 22. The longitudinal axis of the primary grip portion is indicated by line 36.

The base portion 22 is disposed at an acute angle from the primary grip portion 26 as indicated by line 38. The angle is about 15° and has an apex (not shown) generated beyond and rearward to the C-shaped portion 24. The primary grip portion 26 is attached to the base portion 22 via a vertical connector portion 28 which extends downwardly therebetween. As best shown in FIG. 2, the base portion 22, C-shaped portion 24, primary grip portion 26 and vertical connector portion 28 interconnect together to define a generally key-hole like perimeter area 40.

The primary grip portion 26 is provided with an abutment means 42 comprising a raised surface extending downwardly from beneath the primary grip portion 26 and towards the lower portion 16. The abutment means 42 is generally positioned on said primary grip portion 26 where it is joined by the C-shaped portion 24. The abutment means 42 is positioned a selected distance away from the vertical connector portion 28 so as to allow an operators hand to fully grasp the primary grip portion 26 in an unobstructed manner as will be further explained below.

As best shown in FIG. 3, the primary grip portion 26 has a circular cross-section while the base portion 22 has a generally square cross-sectional area. Both are formed of a smooth surface and have a size which readily allows the user to comfortably grasp the handle surface. The C-shaped portion 24 and the vertical connector portion 28 are provided with a cross-sectional surface area of similar geometry to the primary grip portion 26. The net result is a handle which allows an operator's hand to slide across the handle surfaces from grip to grip in an unobstructed manner.

It is contemplated within the scope of the present invention that all of the various grips, i.e., the primary grip 26, C-shaped portion 24 and base portion 22 may be configured with different cross sectional shapes so long as they are positioned relative to each other as described above. For example, the primary grip portion 26 could be molded or formed with a series of repeating recesses in its lower surface to accommodate the curvature of an operators fingers. Additionally, the surfaces could be roughened or otherwise coated to enhance the handles gripping properties.

Figure 4:
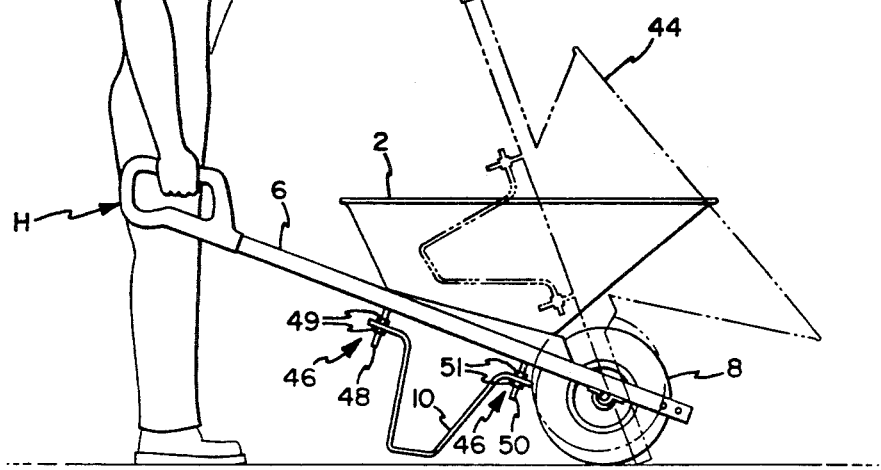
FIG. 4 is a side elevational view illustrating an operator using a wheelbarrow having incorporating the multiple-grip lifting handle shown in FIGS. 1 through 3.

In operation and as best viewed in FIG. 4, an operator O is shown grasping with his hands the primary grip portion 26 so that the wheelbarrow W can be lifted off of the ground and moved from location to location while the contents within the hopper 2 remain level.

When the operator 0 desires to unload the contents from the wheelbarrow W, he slides or otherwise moves his hands from the primary grip portion 26 rearwardly towards the C-shaped portion 24. As his hands move onto the C-shaped portion 24, the operator O is then able to push upwardly in a more efficient manner thereby allowing the contents within the hopper 2 of the wheelbarrow W to be unloaded and as shown by phantom lines 44.

To lower the wheelbarrow W, the operator O reverses the above sequence of movement by moving his hands in an upward direction along the surface of the C-shaped portion 24 while lowering the wheelbarrow W until it is once again possible to grasp the primary grip portion 26. In this way the operator O continually maintains contact with the handle whether he is moving forward, lifting the wheelbarrow or dumping its contents.

The C-shaped portion 24 has additional utility when the operator O is moving the wheelbarrow W in a rearward direction. In that situation (not shown) he would vertically grasp the C-shaped portion 24 while he steps backwards, thereby pulling the wheelbarrow with him. This gripping feature completely eliminates the bending at the wrists associated with such movement.

As best shown in FIG. 4, to compensate for height differences between various operators, the wheelbarrow W is provided with an adjustment means 46 for each of the parallel supports 10 and 12. The adjustments 46 comprise downwardly extended portions 48 and 50 positioned transverse to the parallel handle shafts 4 and 6. Adjustment nuts 49 and 51 are provided to appropriately allow extension or retraction of the parallel supports 10 and 12. Thus, the distance at which the handles H are disposed off of the ground can be adjusted to accommodate the height of a particular operator by appropriately raising or lowering the supports 10 and 12.

A wide range of available materials are contemplated within the scope of the present invention. Construction materials for the handle include but are in no way limited to wood, synthetic rubbers, thermoplastic resins as well as fiberglass resins. The primary requirement of the material chosen is that it is rigid enough to readily support the weight within the while lifting or otherwise operating the wheelbarrow. Also, the handles, according to the present Invention could be formed as one piece with the parallel handle shafts #4 & #6. While this invention has been described as having a preferred design, it is understood that it is capable of further modifications, uses and/or adaptations of the invention following in general the principle of the invention and including such departures from the present disclosure as come within the known or customary practice in the art to which to invention pertains and as may be applied to the central features hereinbefore set forth, and fall within the scope of the invention and of the limits of the appended claims.

I claim:

1. A multiple-grip lifting handle assembly for a handle shaft of a wheelbarrow comprising:
   a. a substantially straight base grip portion adapted for co-axially alignment and connection to the handle shaft of a wheelbarrow,
   b. a substantially c-shaped rear grip portion connected to and extending upwardly in a vertical plane from aid base grip portion,
   c. a primary grip portion extending forwardly from said C-shaped rear grip portion and above said base grip portion and connected to said base grip portion and said C-shaped rear grip portion so as to form a continuous loop lying in a generally vertical plane and extending from said base grip portion to said rear grip portion and said primary grip portion,
   d. said base grip portion being disposed at an acute angle from said primary grip portion; and
   e. an abutment portion comprising a raised surface disposed on said primary grip portion separating send c-shaped rear grip portion therefrom and extending from said primary grip portion towards said base grip portion whereby said abutment portion allows an operator to change hand grips while maintaining contact with the handle yet prevents an operators hand from inadvertently sliding backwards or forwards between said primary grip portion and said C-shaped rear grip portion during wheelbarrow use.

2. A lifting handle as in claim 1 and wherein: a) said base portion has a substantially square cross-sectional surface area.

3. A lifting handle as in claim 1 and wherein:
   a) said primary grip portion has a substantially circular cross-sectional surface area.

4. A lifting handle as in claim 1 and wherein:
   a) said rear portion has a substantially circular cross-sectional surface area.

5. A lifting handle as in claim 1 and wherein:
   a) said base portion includes a handle shaft receiving area extending within the base portion.

6. A lifting handle as in claim 5 and wherein:
   a) said handle shaft receiving area includes a sleeve.

7. A lifting handle as in claim 1 and wherein:
   a) said primary grip portion is connected to said base portion by a vertical connector portion downwardly extending therebetween.

8. A lfiting handle as in claim 1 and wherein:
   a) said primary grip portion is connected to said base portion by a vertical connector portion downwardly extending therebetween.

9. A lifting handle as in claim 8 and wherein:
   a) said abutment portion positioned on said primary grip portion a distance from said vertical connector portion so as to allow complete grasping of said primary grip portion by a users hand.

10. A lifting handle as in claim 1 and wherein:
    a) said primary grip portion and said rear portion have a substantially uniform cross-sectional surface area.

11. A lifting handle as in claim 10 and wherein:
    a) said base portion has a greater cross-sectional surface area than said primary grip portion and said rear portion.

12. A lifting handle as in claim 1 and wherein:
    a) said lifting handle is constructed from a material selected from the group consisting of wood, thermoplastic resins and fiberglass resins.

13. A lifting handle as in claim 1 and wherein:
    a) said acute angle is about 15°.

* * * * *